United States Patent
Bao et al.

(10) Patent No.: US 10,972,709 B2
(45) Date of Patent: Apr. 6, 2021

(54) IMAGE PROCESSING METHOD AND APPARATUS, ELECTRONIC DEVICE, AND COMPUTER STORAGE MEDIUM

(71) Applicant: SHENZHEN SENSETIME TECHNOLOGY CO., LTD., Shenzhen (CN)

(72) Inventors: Xu Bao, Shenzhen (CN); Junfan Lin, Shenzhen (CN); Chao Dong, Shenzhen (CN); Juan Lin, Shenzhen (CN); Haoran Wang, Shenzhen (CN); Ligen Dai, Shenzhen (CN); Furong Zhao, Shenzhen (CN); Mingyang Huang, Shenzhen (CN); Chuanjun Li, Shenzhen (CN); Zhineng Lin, Shenzhen (CN); Songfang Han, Shenzhen (CN); Wenqi Liu, Shenzhen (CN)

(73) Assignee: SHENZHEN SENSETIME TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/720,215

(22) Filed: Dec. 19, 2019

(65) Prior Publication Data
US 2020/0128220 A1 Apr. 23, 2020

Related U.S. Application Data

(63) Continuation of application No. PCT/CN2018/106331, filed on Sep. 18, 2018.

(30) Foreign Application Priority Data

Sep. 30, 2017 (CN) .......................... 201710928746.2

(51) Int. Cl.
*H04N 9/64* (2006.01)
*G06K 9/00* (2006.01)
(Continued)

(52) U.S. Cl.
CPC .......... *H04N 9/643* (2013.01); *G06K 9/00234* (2013.01); *G06T 5/009* (2013.01); *G06T 5/50* (2013.01); *H04N 9/73* (2013.01)

(58) Field of Classification Search
CPC ...... H04N 9/643; H04N 9/73; G06K 9/00234; G06T 5/009; G06T 5/50; G06T 5/002; G06T 5/00; G06T 2207/30201
See application file for complete search history.

(56) References Cited

U.S. PATENT DOCUMENTS

| 5,416,598 A * | 5/1995 | Ezaki | H04N 9/7925 348/207.99 |
| 6,570,673 B2 * | 5/2003 | Kishimoto | G06K 15/028 358/1.2 |

(Continued)

FOREIGN PATENT DOCUMENTS

| CN | 104125442 A | 10/2014 |
| CN | 104517265 A | 4/2015 |

(Continued)

OTHER PUBLICATIONS

International Search Report in the international application No. PCT/CN2018/106331, dated Dec. 25, 2018.
(Continued)

*Primary Examiner* — Brian P Yenke
(74) *Attorney, Agent, or Firm* — Syncoda LLC; Feng Ma

(57) ABSTRACT

An image processing method includes: obtaining a facial skin tone area in an image to be processed; filtering the image to be processed to obtain a filtered smooth image; obtaining a high-frequency image based on the smooth (Continued)

image and the image to be processed; obtaining a facial skin tone high-frequency image based on the high-frequency image and a facial skin tone mask; and superimposing the high-frequency image and the image to be processed based on the facial skin tone mask and preset first superimposition strength in a luma channel, and superimposing a luma channel signal of the facial skin tone high-frequency image onto a luma channel signal of the image to be processed, to obtain a first image.

18 Claims, 7 Drawing Sheets

(51) Int. Cl.
  *G06T 5/00* (2006.01)
  *H04N 9/73* (2006.01)
  *G06T 5/50* (2006.01)

(56) References Cited

U.S. PATENT DOCUMENTS

| | | | | |
|---|---|---|---|---|
| 7,009,662 B2* | 3/2006 | Ojo | ............. | H04N 5/208 348/625 |
| 7,602,440 B2* | 10/2009 | Nishi | ............. | H04N 7/01 348/241 |
| 8,244,004 B2* | 8/2012 | Free | ............. | H04N 5/23219 382/118 |
| 8,358,812 B2* | 1/2013 | Free | ............. | G06K 9/00234 382/118 |
| 8,358,813 B2* | 1/2013 | Free | ............. | G06K 9/00234 382/118 |
| 8,559,708 B2* | 10/2013 | Free | ............. | G06K 9/00234 382/165 |
| 8,660,323 B2* | 2/2014 | Free | ............. | G06K 9/00234 382/118 |
| 8,824,747 B2* | 9/2014 | Free | ............. | G06K 9/00234 382/118 |
| 9,007,480 B2* | 4/2015 | Ciuc | ............. | H04N 9/04 348/222.1 |
| 9,148,637 B2* | 9/2015 | Anderson | ............. | H04N 9/735 |
| 9,390,478 B2* | 7/2016 | Lee | ............. | G06T 5/002 |
| 9,582,879 B2* | 2/2017 | Cheng | ............. | G06K 9/00335 |
| 9,600,864 B2* | 3/2017 | Peng | ............. | G06T 5/20 |
| 9,786,084 B1* | 10/2017 | Bhat | ............. | G06T 7/11 |
| 10,491,815 B2* | 11/2019 | Kajimura | ............. | H04N 5/23232 |
| 10,491,895 B2* | 11/2019 | Socek | ............. | H04N 19/186 |
| 2004/0190786 A1* | 9/2004 | Thakur | ............. | H04N 1/4092 382/254 |
| 2008/0298704 A1* | 12/2008 | Nachlieli | ............. | G06T 5/003 382/254 |
| 2009/0110063 A1* | 4/2009 | Nakayama | ............. | H04N 19/137 375/240.03 |
| 2010/0054550 A1* | 3/2010 | Okada | ............. | G06K 9/00308 382/118 |
| 2010/0172579 A1* | 7/2010 | Reid | ............. | G06K 9/00228 382/165 |
| 2011/0081095 A1* | 4/2011 | Sakashita | ............. | H04N 5/208 382/264 |
| 2011/0181746 A1* | 7/2011 | Free | ............. | H04N 9/643 348/222.1 |
| 2011/0182503 A1* | 7/2011 | Free | ............. | G06K 9/00234 382/162 |
| 2011/0182507 A1* | 7/2011 | Free | ............. | G06K 9/00234 382/164 |
| 2011/0182509 A1* | 7/2011 | Free | ............. | G06K 9/00234 382/165 |
| 2011/0317917 A1* | 12/2011 | Free | ............. | G06K 9/00234 382/167 |
| 2013/0335633 A1* | 12/2013 | Tai | ............. | H04N 5/142 348/606 |
| 2014/0177955 A1* | 6/2014 | Srinivasan | ............. | G06K 9/00375 382/165 |
| 2014/0212037 A1* | 7/2014 | Sasaki | ............. | G06T 7/194 382/167 |
| 2014/0267664 A1* | 9/2014 | Gross | ............. | G06K 9/00362 348/77 |
| 2015/0302564 A1* | 10/2015 | Ho | ............. | G06T 5/20 382/167 |
| 2016/0048949 A1* | 2/2016 | Peng | ............. | G06T 5/20 382/162 |
| 2016/0086316 A1* | 3/2016 | Lee | ............. | H04N 9/643 382/167 |
| 2016/0110868 A1* | 4/2016 | Cheng | ............. | G06K 9/6267 382/128 |
| 2016/0196641 A1* | 7/2016 | Polichroniadis | ............. | G06T 5/50 382/274 |
| 2016/0284070 A1* | 9/2016 | Pettigrew | ............. | G06T 5/002 |
| 2017/0069065 A1 | 3/2017 | Lin | | |
| 2017/0214884 A1* | 7/2017 | Tatsumi | ............. | G06T 3/4092 |
| 2017/0256033 A1* | 9/2017 | Tuzel | ............. | G06K 9/00255 |
| 2017/0339409 A1* | 11/2017 | Socek | ............. | H04N 19/167 |
| 2017/0372459 A1* | 12/2017 | Tan | ............. | G06T 5/005 |
| 2018/0039864 A1* | 2/2018 | Yao | ............. | G06K 9/6268 |
| 2018/0174370 A1* | 6/2018 | Chen | ............. | G06T 15/005 |
| 2018/0204051 A1* | 7/2018 | Li | ............. | G06K 9/6274 |
| 2019/0108628 A1* | 4/2019 | Sato | ............. | H04N 5/23219 |
| 2019/0122411 A1* | 4/2019 | Sachs | ............. | G06T 19/20 |
| 2019/0205694 A1* | 7/2019 | Wang | ............. | G06K 9/00268 |
| 2019/0251674 A1* | 8/2019 | Chang | ............. | G06N 3/02 |
| 2020/0042769 A1* | 2/2020 | Yan | ............. | G06T 7/20 |
| 2020/0043213 A1* | 2/2020 | Bao | ............. | G06K 9/00248 |
| 2020/0126193 A1* | 4/2020 | Hsiao | ............. | G06K 9/00248 |
| 2020/0143230 A1* | 5/2020 | Su | ............. | G06N 3/0454 |
| 2020/0150772 A1* | 5/2020 | Quinn | ............. | A61B 5/1455 |
| 2020/0193142 A1* | 6/2020 | Huang | ............. | G06T 5/002 |
| 2020/0193577 A1* | 6/2020 | Huang | ............. | G06T 7/11 |

FOREIGN PATENT DOCUMENTS

| | | |
|---|---|---|
| CN | 104809694 A | 7/2015 |
| CN | 106375316 A | 2/2017 |
| CN | 106780311 A | 5/2017 |
| CN | 108230331 A | 6/2018 |
| JP | 2009251634 A | 10/2009 |
| JP | 2012053813 A | 3/2012 |
| JP | 2012238135 A | 12/2012 |
| JP | 2014220815 A | 11/2014 |
| JP | 2015060495 A | 3/2015 |
| KR | 20130126386 A | 11/2013 |
| KR | 20160110039 A | 9/2016 |
| WO | 2014174347 A1 | 10/2014 |
| WO | 2015015173 A1 | 2/2015 |
| WO | 2016141866 A1 | 9/2016 |
| WO | 2017041289 A1 | 3/2017 |

OTHER PUBLICATIONS

English translation of the Written Opinion of the International Search Authority in the international application No. PCT/CN2018/106331, dated Dec. 25, 2018.
First Office Action of the Korean application No. 10-2019-7033422, dated Aug. 11, 2020.
First Office Action of the Japanese application No. 2020-515819, dated Nov. 10, 2020.

* cited by examiner

IMAGE PROCESSING METHOD AND APPARATUS, ELECTRONIC DEVICE, AND COMPUTER STORAGE MEDIUM

CROSS-REFERENCE TO RELATED APPLICATION

The present application is a continuation of International Application No. PCT/CN2018/106331, filed on Sep. 18, 2018, which claims priority to Chinese Patent Application No. 201710928746.2, filed on Sep. 30, 2017. The disclosures of these applications are hereby incorporated by reference in their entirety.

BACKGROUND

In recent years, with the popularization and development of artificial intelligence technologies, the use of computers to beautify images has been applied to more and more scenarios, for example, face beautification, scene beautification, and other applications, among which face beautification has gradually become a main application in image beautification applications since face beautification can bring a better user experience.

SUMMARY

Embodiments of the present disclosure relate to, but are not limited to, image processing technologies, and in particular to image processing methods and apparatuses, electronic devices, and computer storage medium.

Embodiments of the present disclosure provide image processing methods and apparatuses, electronic devices, and computer storage medium.

An image processing method provided by the embodiments of the present disclosure includes:

obtaining a facial skin tone area in an image to be processed;

filtering the image to be processed to obtain a filtered smooth image;

obtaining a high-frequency image based on the smooth image and the image to be processed;

obtaining a facial skin tone high-frequency image based on the high-frequency image and a facial skin tone mask; and superimposing a luma channel signal of the facial skin tone high-frequency image onto a luma channel signal of the image to be processed to obtain a first processed image.

An image processing apparatus provided according to one aspect of the embodiments of the present disclosure includes:

an area obtaining unit, configured to obtain a facial skin tone area in an image to be processed;

a filter unit, configured to filter the image to be processed to obtain a smooth image;

a high-frequency obtaining unit, configured to obtain a high-frequency image based on the smooth image and the image to be processed;

a skin tone high-frequency unit, configured to obtain a facial skin tone high-frequency image based on the high-frequency image and a facial skin tone mask; and a signal superimposition unit, configured to superimpose a luma channel signal of the facial skin tone high-frequency image onto a luma channel signal of the image to be processed to obtain a first image.

An electronic device provided according to one aspect of the embodiments of the present disclosure includes a processor, where the processor includes the foregoing image processing apparatus.

An electronic device provided according to one aspect of the embodiments of the present disclosure includes: a memory, configured to store executable instructions; and a processor, configured to communicate with the memory to execute the executable instructions so as to complete operations of the foregoing image processing method.

A computer storage medium provided according to one aspect of the embodiments of the present disclosure is configured to store computer readable instructions, where when the instructions are executed, operations of the foregoing image processing method are executed.

The following further describes in detail the technical solutions of the present disclosure with reference to the accompanying drawings and embodiments.

BRIEF DESCRIPTION OF THE DRAWINGS

The accompanying drawings constituting a part of the specification describe the embodiments of the present disclosure and are intended to explain the principles of the present disclosure together with the descriptions.

According to the following detailed description, the present disclosure can be understood more clearly with reference to the accompanying drawings.

DETAILED DESCRIPTIONS

Figure 1:
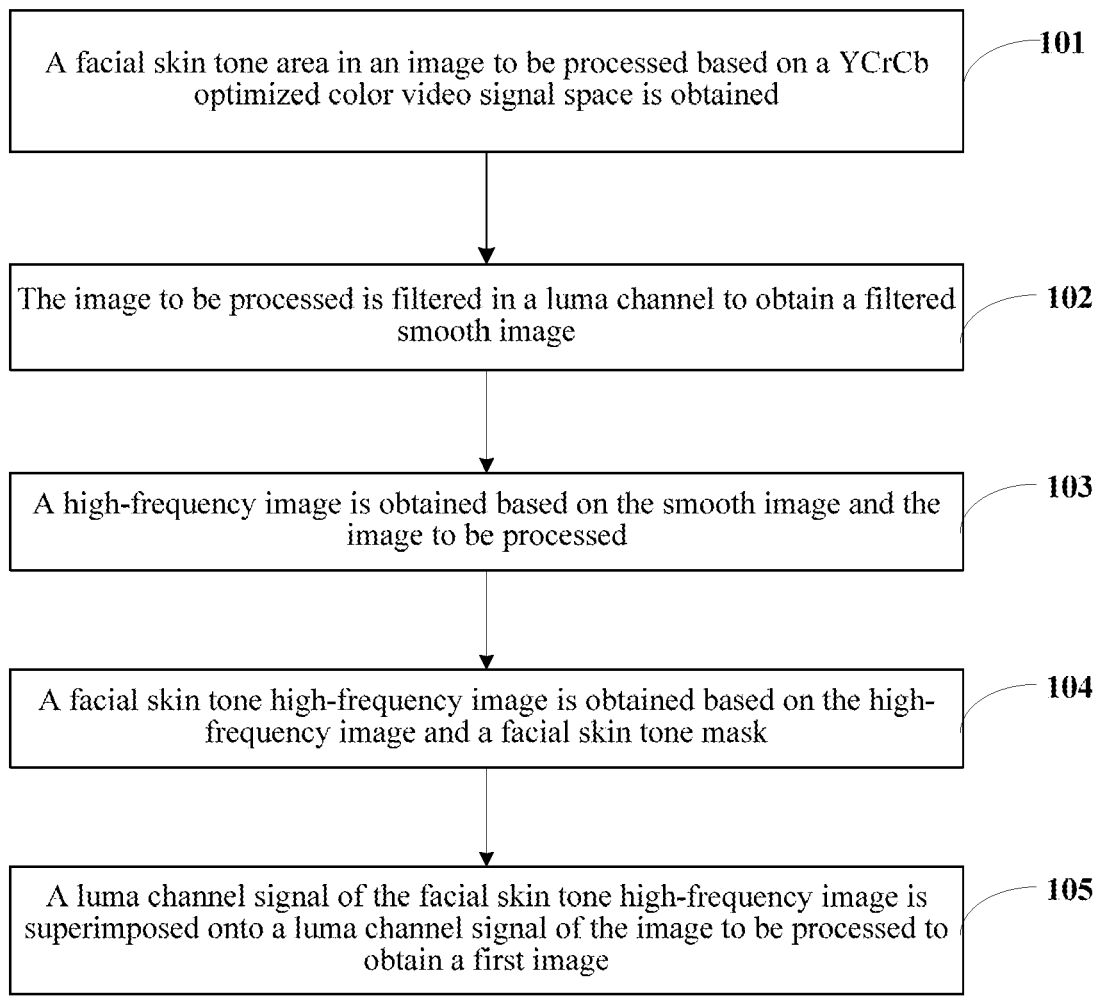
FIG. 1 illustrates a flowchart of one embodiment of an image processing method according to the present disclosure.

According to the image processing methods provided by the foregoing embodiments of the present disclosure, by obtaining a facial skin tone area in an image to be processed, a face area that needs to be processed is determined, so that only the face area is subsequently processed without affecting the display effect of the other parts of the image; the image to be processed is filtered to obtain a smooth image; a high-frequency image is obtained based on the smooth image and the image to be processed; details of the facial skin are optimized by means of the high-frequency image; and a luma channel signal of the facial skin tone high-frequency image is superimposed onto a luma channel signal of the image to be processed, to targetedly increase the luma of the details of the facial skin. Thus, the face image may have a more stereoscopic and highlighted display effect.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure.

In addition, it should be understood that, for ease of description, the size of each part shown in the accompanying drawings is not drawn in actual proportion.

The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to a computer system/server, which may operate with numerous other general-purpose or special-purpose computing system environments or configurations. Examples of well-known computing systems, environments, and/or configurations suitable for use together with the computer system/server include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The computer system/server may be described in the general context of computer system executable instructions (for example, program modules) executed by the computer system. Generally, the program modules may include routines, programs, target programs, components, logics, data structures, and the like for performing specific tasks or implementing specific abstract data types. The computer system/server may be practiced in the distributed cloud computing environments in which tasks are performed by remote processing devices that are linked through a communications network. In the distributed computing environments, the program modules may be located in local or remote computing system storage medium including storage devices.

In the process of implementing the present disclosure, the inventor finds that at least the following problem exists in the prior art: in the prior art, in a face image having undergone beautifying processing, the overall skin tone is yellowish or reddish and lacks a stereoscopic effect and a moistening effect.

A mask is to obtain the interior of a marquee as a selection by the marquee. The word "mask" itself comes from an application in life, and has the meaning of "a canvas for covering."

FIG. 1 is a flowchart of one embodiment of an image processing method according to the present disclosure. As shown in FIG. 1, the method of this embodiment includes the following operations.

At operation 101, a facial skin tone area in an image to be processed is obtained.

According to one or more embodiments of the present disclosure, the meaning of the term "facial skin" comprises a human facial skin, and the meaning of the term "face" comprises a human face.

There are many ways to obtain the facial skin tone area, as long as which parts of the image involve skin tone can be identified. The facial skin tone area may be obtained based on chroma and saturation in a YCrCb optimized color video signal space, or may be obtained by a neural network or other technologies.

By obtaining the facial skin tone area in the image to be processed, a face area that needs to be processed is determined, so that only the face area is subsequently processed without affecting the display effect of the other parts of the image.

At operation 102, the image to be processed is filtered to obtain a filtered smooth image.

Image filtering is to suppress the noise of a target image while retaining the detail features of the image as much as possible, and is an indispensable operation in image preprocessing, and its processing effect would directly affect the effectiveness and reliability of subsequent image processing and analysis. In the embodiments, a high-frequency image is obtained based on the smooth image and the image to be processed. The high-frequency image can reflect more details of the skin, so as to optimize the details of the facial skin.

At operation 103, a high-frequency image is obtained based on the smooth image and the image to be processed.

At operation 104, a facial skin tone high-frequency image is obtained based on the high-frequency image and a facial skin tone mask.

Generally, the overall skin tone is yellowish or reddish (i.e., a facial skin tone mask) in a face image having undergone beautifying processing. In one embodiment, the details of the facial skin are optimized by means of the high-frequency image by associating "the facial skin tone mask with the facial skin tone area."

At operation 105, a luma channel signal of the facial skin tone high-frequency image is superimposed onto a luma channel signal of the image to be processed to obtain a first image.

The first image is obtained by superimposing the image to be processed and the facial skin tone high-frequency image in a luma channel of the image. In this way, in the first image obtained by superimposing the luma channel signal of the facial skin tone high-frequency image onto the luma channel signal of the image to be processed, the luma of the details of the facial skin is targetedly increased. Thus, the face image may have a more stereoscopic and highlighted display effect.

According to the image processing method provided by the foregoing embodiment of the present disclosure, by obtaining a facial skin tone area in an image to be processed, converting the received image to be processed to an optimized color video signal space, and determining a facial skin tone mask in the image to be processed in the optimized color video signal space, a face area that needs to be processed is determined, so that only the face area is subsequently processed without affecting the display effect of the other parts of the image; the image to be processed is filtered to obtain a filtered smooth image; a high-frequency image is obtained based on the smooth image and the image to be processed; details of the facial skin are optimized by means of the high-frequency image, where more details of the skin can be reflected in the high-frequency image, making facial skin optimization more precise; and a luma channel signal of the facial skin tone high-frequency image is superimposed onto a luma channel signal of the image to be processed. By superimposing the high-frequency image and the image to be processed based on the facial skin tone mask and preset first superimposition strength in a luma channel, the luma of the details of the facial skin is targetedly increased. Thus, the face image may have a more stereoscopic and highlighted display effect.

In an example of the foregoing embodiments, operation 101 includes: obtaining the facial skin tone area in the image to be processed based on a YCrCb optimized color video signal space, where the YCrCb optimized color video signal space includes a luma channel, a chroma channel, and a saturation channel; and operation 102 includes: filtering the image to be processed in the luma channel.

YCrCb is YUV, and is mainly used to optimize the transmission of a color video signal, where Y represents luma (or luminance), i.e., a grayscale value, Cr represents tone, and Cb represents saturation. YCrCb is often used to optimize a color video signal space in face detection. Because a conventional image is based on a RGB space, and the facial skin tone in the RGB space is greatly affected by luma, skin tone points are difficult to be separated from non-skin tone points. That is to say, after this space is processed, skin tone points are discrete points, and a number of non-skin tone points are embedded therein, thus bringing problems for skin tone area demarcation (face demarcation, eyes, or the like). If the RGB space is changed into a YCrCb space, the influence of Y (luma) may be ignored, since the space is less affected by luma and a good clustering effect is produced for the skin tone. In this way, a three-dimensional space is reduced to a two-dimensional CrCb, and skin tone points form a certain shape, for example, a face area is presented for a face, and an arm shape is presented for an arm. This is beneficial to processing mode identification. Accordingly, in the embodiments, the image to be processed is converted to a YCrCb space to obtain a facial skin tone mask as a facial skin tone area.

In an example of the foregoing embodiments, operation 101 may further include: determining a skin tone area in the image to be processed based on a chroma value and a saturation value of the image to be processed in the optimized color video signal space; and obtaining a face key point of the image to be processed by using a neural network, and determining the facial skin tone area in the image to be processed according to the face key point.

In one or more embodiments, according to experience, in the YCrCb space, if the Cr chroma value and the Cb saturation value of a certain point satisfy the conditions that: 133≤Cr≤173 and 77≤Cb≤127, then the point is considered to be a skin tone point, and others are non-skin tone points. Thereby, a skin tone area mask in the image to be processed may be determined in the YCrCb space. Moreover, a face key point may be calculated by means of a trained neural network, and a facial skin tone area may be determined by superimposing the face key point onto the skin tone area mask, that is, a face area that needs to be processed later is determined.

In an example of the foregoing embodiments, operation 102 includes: performing box filtering on all pixel values in the luma channel of the image to be processed by means of a filter.

In one or more embodiments, details of the facial skin which need to be optimized are obtained by means of filtering, and by subtracting these details which need to be optimized from the original image to be processed, a high-frequency image which highlights only the optimized image details is obtained. Box filtering refers to first providing a kernel, and multiplying the value of each point of the kernel by a corresponding image pixel value. After filtering, edge information of the image is lost.

In an example of the foregoing embodiments, operation 103 includes: subtracting pixel values of the smooth image at corresponding positions in the luma channel from all pixel values in the luma channel of the image to be processed to obtain the high-frequency image.

In one or more embodiments, noise is removed from the smooth image obtained by the filtering, and the luma of the details of the facial skin is adjusted by means of the high-frequency image obtained by subtracting the smooth image in the luma channel.

In an example of the foregoing embodiments, operation 104 includes: performing element multiplication on the high-frequency image and the facial skin tone mask based on preset first superimposition strength to obtain the facial skin tone high-frequency image.

In one or more embodiments, the facial skin tone high-frequency image is obtained by means of adjustable first superimposition strength, so that the luma of the human skin can be adjusted within a controllable range, or can be adjusted according to user requirements. In the embodiments, if the high-frequency image is directly superimposed onto the original image to be processed, all the details in the image would be processed. However, in the present disclosure, only the details of the facial skin tone need to be optimized. Therefore, before the superimposition, a dot product operation is performed on the high-frequency image and the facial skin tone mask, and the details of the face are optimized based on first superimposition strength set according to optimization strength required by the user. The superimposition formula in the embodiments is as shown by formula (1):

$$Y1=Y+\text{highpass}*\text{mask2}*\text{level1} \quad \text{formula (1)};$$

where Y is a pixmap of the image to be processed in the luma channel, and Y1 is a pixmap of the first image in the luma channel; the blurred image obtained based on the box filtering is recorded as smooth_Y, the high-frequency image is that highpass=Y−smooth_Y, mask2 is the facial skin mask, and level1 is the preset first superimposition strength.

In an example of the foregoing embodiments, the method further includes the following operation: the image to be processed is converted to the optimized color video signal space.

In one or more embodiments, the original space of the image to be processed is not limited, as long as the image to be processed is in the YCrCb space after the conversion. The conversion here may be one conversion, or multiple conversions. For example, the image to be processed, whether in an RGB space or an NV21 format, may be directly converted to the YCrCb space. The formula for conversion from the RGB space to the YCrCb space is as follows (the formula from RGB to YcrCb is not single):

$$//Y=0.2990R+0.5870G+0.1140B$$

$$//Cb=-0.1687R-0.3313G+0.5000B+128$$

$$//Cr=0.5000R-0.4187G-0.0813B+128.$$

In an example of the foregoing embodiments, before operation 105, the method may further include the following operations:

the luma channel signal of the image to be processed is obtained based on the luma channel of the YCrCb optimized color video signal space; and the luma channel signal of the facial skin tone high-frequency image is obtained based on the luma channel of the YCrCb optimized color video signal space.

In one or more embodiments, when the image to be processed and the facial skin tone high-frequency image are in the YCrCb space, signals of the image to be processed and the facial skin tone high-frequency image separately in the luma channel, the chroma channel, and the saturation channel may be obtained. Thus, luma signals corresponding to the image to be processed and the facial skin tone high-frequency image may be directly obtained in the YCrCb space.

Figure 2:
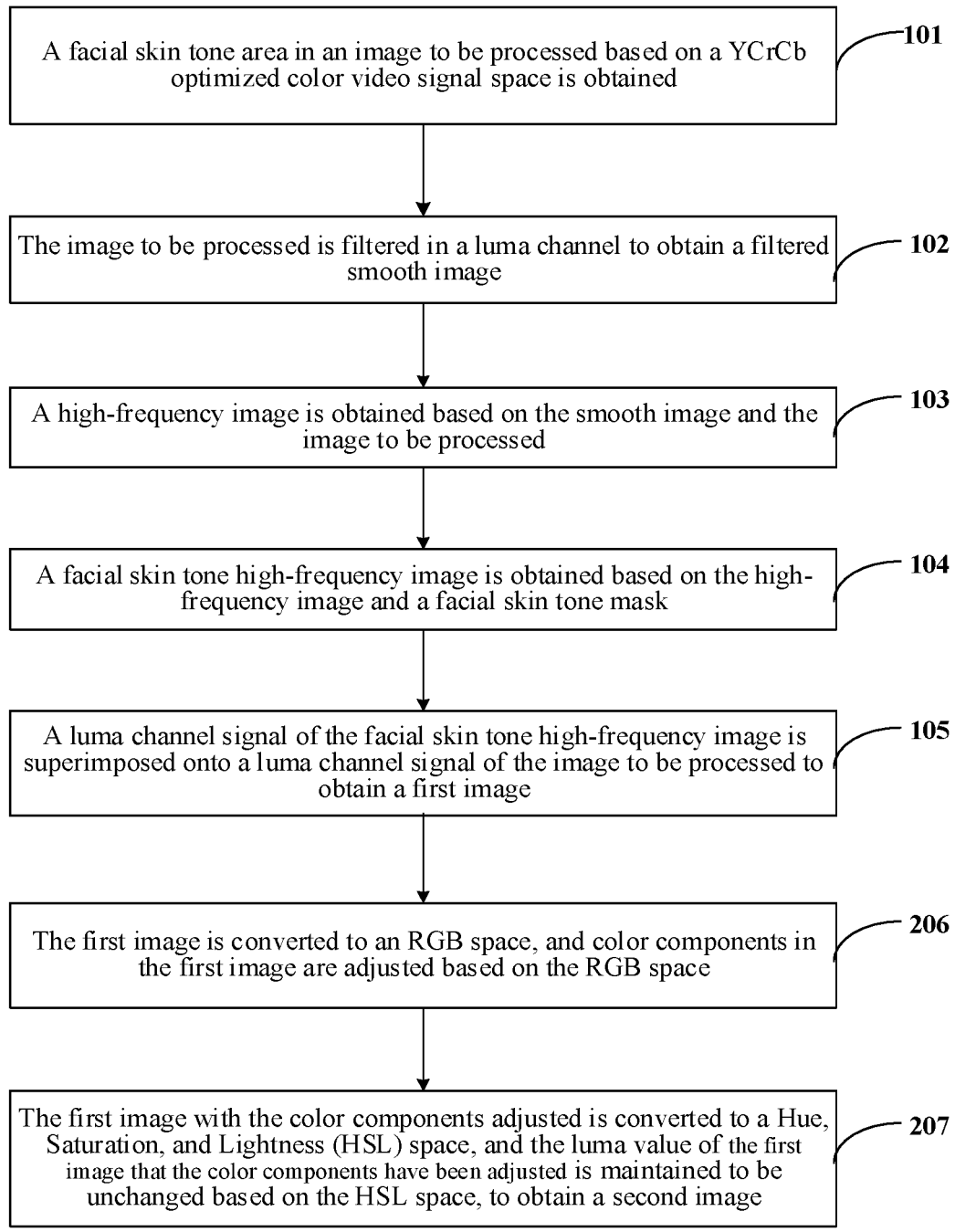
FIG. 2 illustrates a flowchart of another embodiment of an image processing method according to the present disclosure.

FIG. 2 is a flowchart of another embodiment of an image processing method according to the present disclosure. As shown in FIG. 2, the method of this embodiment includes the following operations.

At operation 101, a facial skin tone area in an image to be processed based on a YCrCb optimized color video signal space is obtained.

At operation 102, the image to be processed is filtered in a luma channel to obtain a filtered smooth image.

At operation 103, a high-frequency image is obtained based on the smooth image and the image to be processed.

At operation 104, a facial skin tone high-frequency image is obtained based on the high-frequency image and a facial skin tone mask.

At operation 105, a luma channel signal of the facial skin tone high-frequency image is superimposed onto a luma channel signal of the image to be processed to obtain a first image.

At operation 206, the first image is converted to an RGB space, and color components in the first image are adjusted based on the RGB space.

The RGB color mode is a color standard in industry, and is to obtain various colors by changing three color channels of Red (R), Green (G), and Blue (B) and superimposing them on each other. RGB represents the colors of the three channels of red, green and blue. By adjusting the colors in the first image in the RGB space, the color of the facial skin tone is adjusted.

At operation 207, the first image that the color components have been adjusted is converted to a Hue, Saturation, and Lightness (HSL) space, and the luma value of the first image that the color components have been adjusted is maintained to be unchanged based on the HSL space, to obtain a second image.

The HSL color mode is a color standard in industry, and is to obtain various colors by changing three color channels of Hue (H), Saturation (S) and Lightness (L) and superimposing them on each other. HSL represents the colors of the three channels of hue, saturation, and lightness. By maintaining the luma value of the first image to be unchanged in the HSL space, a second image may be obtained. In other words, the second image is derived from the first image and satisfies "some conditions." The "some conditions" are adjusting the color components of the first image, converting the first image to the HSL space, and maintaining the luma value of the first image to be unchanged, to obtain an image after such processing.

In some other embodiments, the method further includes the following operations: the second image is converted to the YCrCb space, and a shadow area mask on a face area in the second image is obtained based on the values of luma and chroma in the YCrCb space; and the luma value and the red component value in the shadow area mask are increased to obtain a fourth image. The fourth image is derived from the second image which is in the HSL space. The second image is converted from the HSL space to the YCrCb space, then a shadow area mask on the face area is obtained from the second image based on the values of luma and chroma, and finally the luma value and the red component value in the shadow area mask are increased to obtain a fourth image.

According to the image processing method provided by the embodiments, by adjusting the colors and tones in the first image in the RGB space, the problem in the prior art that the overall skin tone is yellowish or reddish after beautifying processing is overcome, making the skin tone meet requirements, and making the facial skin shiny in combination with luma adjustment.

In an example of the foregoing embodiments, operation 206 includes: increasing cyan component and magenta component and reducing yellow component in the first image based on the RGB space. In the embodiments, in the RGB space, the R, G, and B values corresponding to cyan are respectively 0, 255, and 255, the R, G, and B values corresponding to magenta are respectively 255, 0, and 255, and the R, G, and B values corresponding to yellow are respectively 255, 255, and 0. By adjusting the components of the three colors, or by adjusting the components of the three primary colors, i.e., Red (R), Green (G), and Blue (B), the facial skin tone may be more rosy and healthy, and a better visual effect may be achieved.

Figure 3:
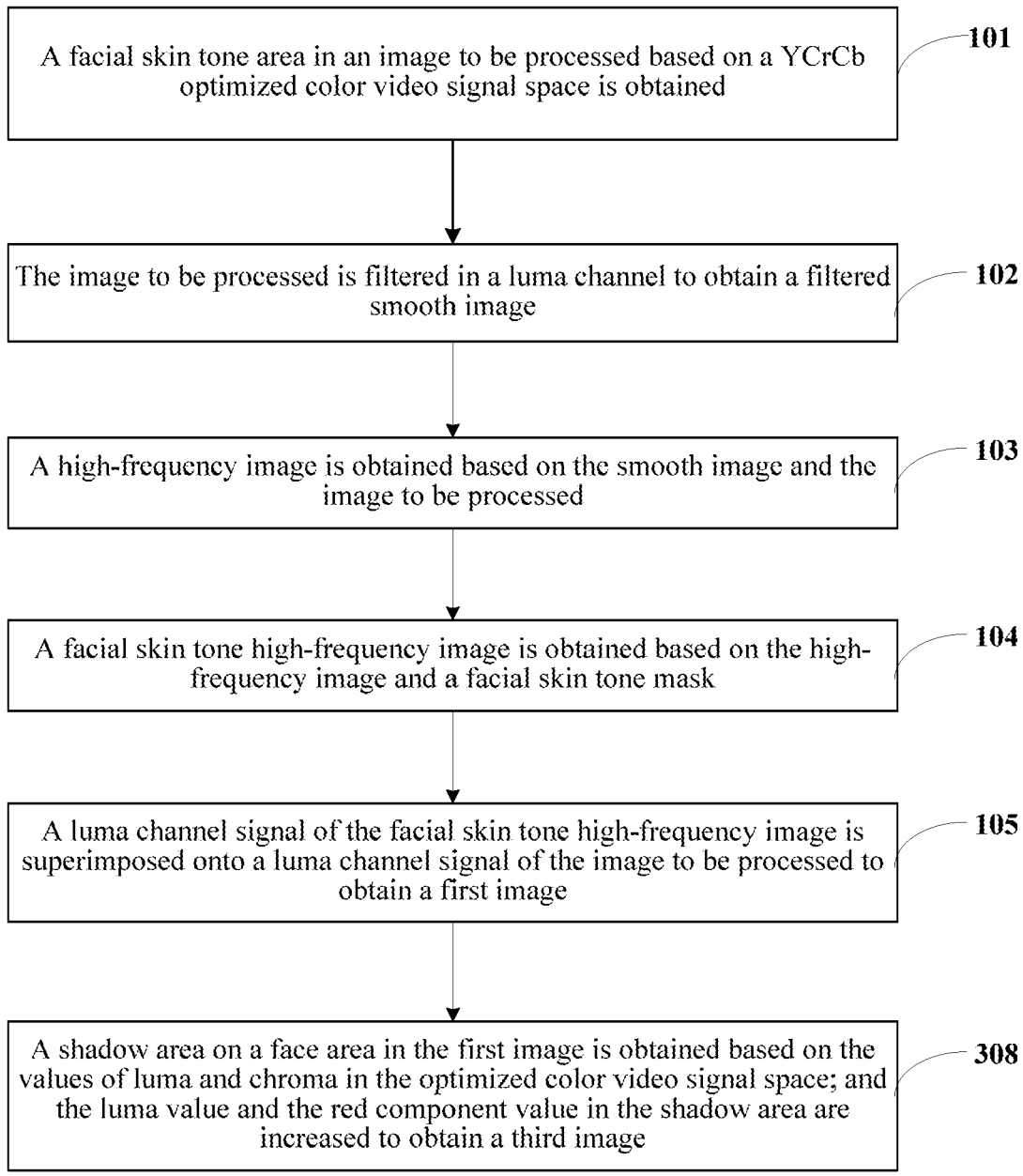
FIG. 3 illustrates a flowchart of still another embodiment of an image processing method according to the present disclosure.

FIG. 3 is a flowchart of still another embodiment of an image processing method according to the present disclosure. As shown in FIG. 3, the method of this embodiment includes the following operations.

At operation 101, a facial skin tone area in an image to be processed based on a YCrCb (optimized color video signal) space is obtained.

At operation 102, the image to be processed is filtered in a luma channel to obtain a filtered smooth image.

At operation 103, a high-frequency image is obtained based on the smooth image and the image to be processed.

At operation 104, a facial skin tone high-frequency image is obtained based on the high-frequency image and a facial skin tone mask.

At operation 105, a luma channel signal of the facial skin tone high-frequency image is superimposed onto a luma channel signal of the image to be processed to obtain a first image.

At operation 308, a shadow area on a face area in the first image is obtained based on the values of luma and chroma in the optimized color video signal space; and the luma value and the red component value in the shadow area are increased to obtain a third image.

The third image is derived from the first image and the second image is also derived from the first image. Upon comparison, the second image is obtained by processing the first image in the HSL space, and the third image is obtained by processing the first image in the YCrCb space.

In one or more embodiments, a shadow area in the face area may be determined by means of luma and chroma, and by adjusting the luma value and the red component value in the shadow area, the stereoscopic effect of the skin may be improved and a shiny and rosy effect may be achieved.

In an example of the foregoing embodiments, the increasing the luma value in the shadow area includes the following operations:

at operation A1, a first luma superimposition map is obtained based on a dot product of all pixel values of the shadow area in the luma channel and a superimposition value of the first image in the luma channel;

at operation A2, a first luma dot product is obtained by performing a dot product operation on the first luma superimposition map and preset second superimposition strength; and at operation A3, the first luma dot product is correspondingly superimposed onto pixel values of the first image in the luma channel.

In one or more embodiments, in order to adjust the luma of only the facial shadow area, when adjusting the luma value, first a dot product of the superimposition value of luma and the shadow area is obtained, and then the facial shadow area with the luma processed is superimposed onto the first image based on second superimposition strength preset by the user. Thus, the luma of the facial shadow area is adjusted based on a first image, and the stereoscopic effect of the skin is improved.

The superimposition formula in one or more embodiments is as shown by formula (2):

$$Y3=Y1+Y\_add*mask4*level2 \quad \text{formula (2)};$$

where Y1 is a pixmap of the first image in the luma channel, and Y3 is a pixmap of the third image in the luma channel; Y_add is the superimposition value of the luma channel component, mask4 is the facial shadow mask, and level2 is the preset second superimposition strength.

In an example of the foregoing embodiments, the increasing the red component value in the shadow area includes the following operations:

at operation B1, a first chroma superimposition map is obtained based on a dot product of all pixel values of the shadow area in the chroma channel and a superimposition value of the first image in the chroma channel;

at operation B2, a first chroma dot product is obtained by performing a dot product operation on the first chroma superimposition map and the preset second superimposition strength; and at operation B3, the first chroma dot product is correspondingly superimposed onto pixel values of the first image in the chroma channel.

The superimposition formula in one or more embodiments is as shown by formula (3):

$$Cr3=Cr1+Cr\_add*mask4*level2 \quad \text{formula (3)};$$

where Cr1 is a pixmap of the first image in the chroma channel, and Cr3 is a pixmap of the third image in the chroma channel; Cr_add is the superimposition value of the chroma channel component, mask4 is the facial shadow mask, and level2 is the preset second superimposition strength.

In the embodiments, in order to adjust the chroma of only the facial shadow area, when adjusting the chroma value, first a dot product of the superimposition value of chroma and the shadow area mask is obtained, and then the facial shadow area with the chroma processed is superimposed onto the first image based on second superimposition strength preset by the user. Thus, the chroma of the facial shadow area is adjusted based on the first image, and the rosy effect of the skin is improved.

Figure 4:
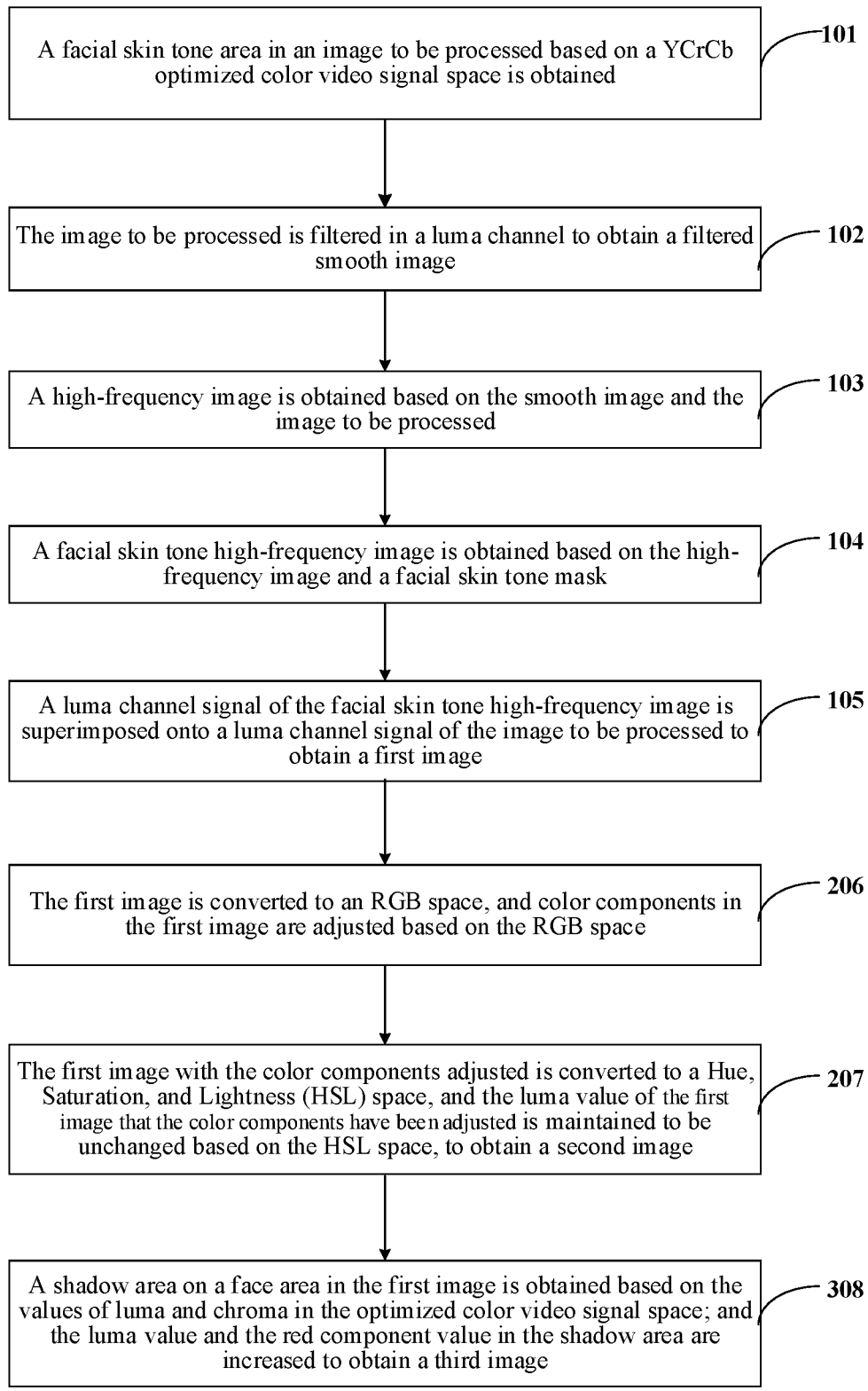
FIG. 4 illustrates a flowchart of yet another embodiment of an image processing method according to the present disclosure.

FIG. 4 is a flowchart of yet another embodiment of an image processing method according to the present disclosure. As shown in FIG. 4, the method of this embodiment includes the following operations.

At operation 101, a facial skin tone area in an image to be processed based on a YCrCb optimized color video signal space is obtained.

At operation 102, the image to be processed is filtered in a luma channel to obtain a filtered smooth image.

At operation 103, a high-frequency image is obtained based on the smooth image and the image to be processed.

At operation 104, a facial skin tone high-frequency image is obtained based on the high-frequency image and a facial skin tone mask.

At operation 105, a luma channel signal of the facial skin tone high-frequency image is superimposed onto a luma channel signal of the image to be processed to obtain a first image. At operation 206, the first image is converted to an RGB space, and color components in the first image are adjusted based on the RGB space.

At operation 207, the first image that the color components have been adjusted is converted to an HSL space, and the luma value of the first image that the color components have been adjusted is maintained to be unchanged based on the HSL space, to obtain a second image.

At operation 308, a shadow area on a face area in the first image is obtained based on the values of luma and chroma in the optimized color video signal space; and the luma value and the red component value in the shadow area are increased to obtain a third image.

In the embodiments, based on the second image, a shadow area mask in the face area may be determined by means of luma and chroma, and by adjusting the luma value and the red component value in the shadow area mask, the stereoscopic effect of the skin may be improved and a shiny and rosy effect may be achieved.

In an example of the foregoing embodiments, the increasing the luma value in the shadow area includes the following operations: at operation C1, a second luma superimposition map is obtained based on a dot product of all pixel values of the shadow area mask in the luma channel and a superimposition value of the second image in the luma channel; at operation C2, a second luma dot product is obtained by performing a dot product operation on the second luma superimposition map and preset second superimposition strength; and at operation C3, the second luma dot product is correspondingly superimposed onto pixel values of the second image in the luma channel.

In one or more embodiments, in order to adjust the luma of only the facial shadow area, when adjusting the luma value, first a dot product of the superimposition value of luma and the shadow area mask is obtained, and then the facial shadow area with the luma processed is superimposed onto the second image based on second superimposition strength preset by the user. Thus, the luma of the facial shadow area is adjusted based on the second image, and the stereoscopic effect of the skin is improved.

In an example of the foregoing embodiments, the increasing the red component value in the shadow area includes the following operations.

At operation D1, a second chroma superimposition map is obtained based on a dot product of all pixel values of the shadow area in the chroma channel and a superimposition value of the second image in the chroma channel.

At operation D2, a second chroma dot product is obtained by performing a dot product operation on the second chroma superimposition map and the preset second superimposition strength.

At operation D3, the second chroma dot product is correspondingly superimposed onto pixel values of the second image in the chroma channel.

In one or more embodiments, in order to adjust the chroma of only the facial shadow area, when adjusting the chroma value, first a dot product of the superimposition value of chroma and the shadow area mask is obtained, and then the facial shadow area with the chroma processed is superimposed onto the second image based on second superimposition strength preset by the user. Thus, the chroma of the facial shadow area is adjusted based on the second image, and the rosy effect of the skin is improved.

According to still another embodiment of the image processing method provided by the present disclosure, based on the foregoing embodiments of FIGS. 1, 3, and 4, the method of this embodiment further includes the following operations: a lip area on a face area in the first image, the third image, or the fourth image is obtained according to the values of luma and chroma in the optimized color video signal space; and the luma value and the red component value in the lip area are increased to obtain a fifth image.

The fifth image may be derived from the first image, the third image, or the fourth image, for example, the fifth image is obtained by increasing the luma value and the red component value in a lip area in the first, third, or fourth image.

In one or more embodiments, for the optimized first image, third image or fourth image, a lip area is determined based on the values of luma and chroma in the YCrCb space, and the luma value and the red component value in the lip area are increased to achieve a lip reddening and brightening effect, thereby further improving user experience.

In an example of the foregoing embodiments, the increasing the luma value in the lip area includes the following operations.

At operation E1, a third luma superimposition map, a fourth luma superimposition map, or a fifth luma superimposition map is obtained based on a dot product of all pixel values of the lip area in the luma channel and a superimposition value of the first image, the third image, or the fourth image in the luma channel. At operation E2, a dot product of the third luma superimposition map and preset third superimposition strength is correspondingly superimposed onto pixel values of the first image in the luma channel. At operation E3, a dot product of the fourth luma superimposition map and the preset third superimposition strength is correspondingly superimposed onto pixel values of the third image in the luma channel. At operation E4, a dot product of the fifth luma superimposition map and the preset third superimposition strength is correspondingly superimposed onto pixel values of the fourth image in the luma channel.

This embodiment actually provides three examples, including processing based on the first image, processing based on the third image, and processing based on the fourth image. By superimposing a superimposition image of the lip area obtained from the image in the luma channel onto the original image according to third superimposition strength preset by the user, the luma of a lip area mask is increased.

In an example of the foregoing embodiments, the increasing the red component value in the lip area includes the following operations.

At operation F1, a third chroma superimposition map, a fourth chroma superimposition map, or a fifth chroma superimposition map is obtained by performing a dot product operation on all pixel values of the lip area in the chroma channel and a superimposition value of the first image, the third image, or the fourth image in the chroma channel. At operation F2, a dot product of the third chroma superimposition map and the preset third superimposition strength is correspondingly superimposed onto pixel values of the first image in the luma channel. At operation F3, a dot product of the fourth chroma superimposition map and the preset third superimposition strength is correspondingly superimposed onto pixel values of the third image in the luma channel. At operation F4, a dot product of the fifth chroma superimposition map and the preset third superimposition strength is correspondingly superimposed onto pixel values of the fourth image in the luma channel.

This embodiment actually provides three examples, including processing based on the first image, processing based on the third image, and processing based on the fourth image. By superimposing a superimposition image of the lip area obtained from the image in the chroma channel onto the original image according to third superimposition strength preset by the user, the chroma of a lip area mask is reddened, thereby achieving a lip reddening effect.

The superimposition formula in one or more embodiments is as shown by formula (4):

$$Y5 = Yi + Y\_add2 * mask5 * level3 \quad \text{formula (4)};$$

where $Yi$ is a pixmap of the i-th image in the luma channel, the value of i being 1, 3 or 4 (the case where i is 2 is illustrated in still another embodiment below), $Y5$ is a pixmap of the fifth image in the luma channel, $Y\_add2$ is the superimposition value of the luma channel component, $mask5$ is the lip area mask, and $level3$ is the preset third superimposition strength.

According to still another embodiment of the image processing method provided by the present disclosure, based on the foregoing embodiment of FIG. 2, the method of this embodiment further includes the following operations. At operation G1, the second image is converted to the optimized color video signal space, and a lip area on a face area in the second image is obtained based on the values of luma and chroma in the optimized color video signal space. At operation G2, the luma value and the red component value in the lip area are increased to obtain a sixth image. The sixth image is similar to the fourth image, except that the fourth image is about the shadow area mask on the face area in the second image while the sixth image is about the lip area on the face area in the second image.

In one or more embodiments, since the processing space of the second image is in the HSL space, before processing the lip area, first the second image is converted to a YCrCb space, a lip area is determined based on the values of luma and chroma in the YCrCb space, and the luma value and the red component value in the lip area are increased to achieve a lip reddening and brightening effect, thereby further improving user experience.

The superimposition formula in one or more embodiments is as shown by formula (5):

$$Cr5 = Cri + Cr\_add2 * mask5 * level3 \quad \text{formula (5)};$$

where $Cri$ is a pixmap of the i-th image in the chroma channel, the value of i being 1, 3 or 4 (the case where i is 2 is illustrated in still another embodiment below), $Cr5$ is a pixmap of the fifth image in the chroma channel, $Cr\_add2$ is the superimposition value of the chroma channel component, $mask5$ is the lip area mask, and $level3$ is the preset third superimposition strength.

In an example of the foregoing embodiments, the increasing the luma value in the lip area includes the following operations.

At operation H1, a sixth luma superimposition map is obtained based on a dot product of all pixel values of the lip area in the luma channel and a superimposition value of the second image in the luma channel. At operation H2, a dot product of the sixth luma superimposition map and the preset third superimposition strength is correspondingly superimposed onto pixel values of the second image in the luma channel.

In one or more embodiments, by superimposing a superimposition image of the lip area obtained from the image in the luma channel onto the original image according to third superimposition strength preset by the user, the luma of the lip area is increased.

In an example of the foregoing embodiments, the increasing the red component value in the lip area includes the following operations.

At operation J1, a sixth chroma superimposition map is obtained based on a dot product of all pixel values of the lip area in the chroma channel and a superimposition value of the second image in the chroma channel. At operation J2, a dot product of the sixth chroma superimposition map and the preset third superimposition strength is correspondingly superimposed onto pixel values of the second image in the luma channel.

In one or more embodiments, by superimposing a superimposition image of the lip area obtained from the image in the chroma channel onto the original image according to third superimposition strength preset by the user, the chroma of a lip area mask is reddened, thereby achieving a lip reddening effect.

Figure 5:
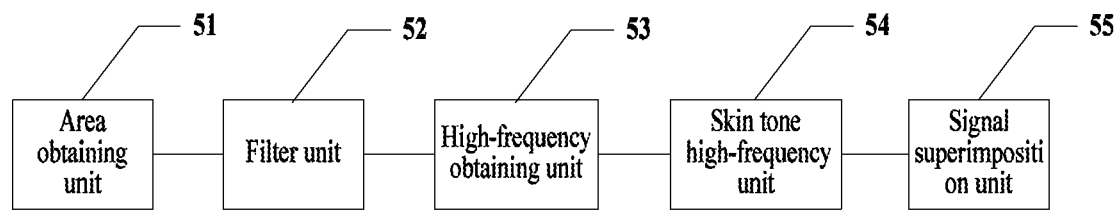
FIG. 5 illustrates a schematic structural diagram of one embodiment of an image processing apparatus according to the present disclosure.

FIG. 5 is a schematic structural diagram of one embodiment of an image processing apparatus according to the present disclosure. The apparatus of this embodiment may be used for implementing the foregoing method embodiments of the present disclosure. As shown in FIG. 5, the apparatus of this embodiment includes:

an area obtaining unit 51, configured to obtain a facial skin tone area in an image to be processed, where there are many ways to obtain the facial skin tone area, as long as which parts of the image involve skin tone can be identified. The facial skin tone area may be obtained based on chroma and saturation in a YCrCb optimized color video signal space, or may be obtained by a neural network or other technologies;

a filter unit 52, configured to filter the image to be processed to obtain a smooth image, where image filtering is to suppress the noise of a target image while retaining the detail features of the image as much as possible, and is an indispensable operation in image preprocessing, and its processing effect would directly affect the effectiveness and reliability of subsequent image processing and analysis; in the embodiments, a high-frequency image is obtained based on the smooth image and the image to be processed, and the high-frequency image can reflect more details of the skin, so as to optimize the details of the facial skin;

a high-frequency obtaining unit 53, configured to obtain a high-frequency image based on the smooth image and the image to be processed;

a skin tone high-frequency unit 54, configured to obtain a facial skin tone high-frequency image based on the high-frequency image and a facial skin tone mask; and a signal superimposition unit 55, configured to superimpose a luma channel signal of the facial skin tone high-frequency image onto a luma channel signal of the image to be processed to obtain a first image.

According to the image processing apparatus provided by the foregoing embodiment of the present disclosure, by obtaining a facial skin tone area in an image to be processed, converting the received image to be processed to an optimized color video signal space, and determining a facial skin tone mask in the image to be processed in the optimized color video signal space, a face area that needs to be processed is determined, so that only the face area is subsequently processed without affecting the display effect of the other parts of the image; the image to be processed is filtered to obtain a filtered smooth image; a high-frequency image is obtained based on the smooth image and the image to be processed; details of the facial skin are optimized by means of the high-frequency image, where more details of the skin can be reflected in the high-frequency image, making facial skin optimization more precise; and a luma channel signal of the facial skin tone high-frequency image is superimposed onto a luma channel signal of the image to be processed. By superimposing the high-frequency image and the image to be processed based on the facial skin tone mask and preset first superimposition strength in a luma channel, the luma of the details of the facial skin is targetedly increased. Thus, the face image may have a more stereoscopic and highlighted display effect.

In an example of the foregoing embodiments, the area obtaining unit 51 is configured to obtain the facial skin tone area in the image to be processed based on a YCrCb optimized color video signal space, where the YCrCb optimized color video signal space includes a luma channel, a chroma channel, and a saturation channel;

the filter unit 52 is configured to filter the image to be processed in the luma channel.

In an example of the foregoing embodiments, the area obtaining unit 51 includes: a skin tone identification module configured to determine a skin tone area in the image to be processed based on a chroma value and a saturation value of the image to be processed in the optimized color video signal space; and an area identification module, configured to obtain a face key point of the image to be processed by using a neural network, and determine the facial skin tone area in the image to be processed according to the face key point.

In an example of the foregoing embodiments, the filter unit 52 is configured to perform box filtering on all pixel values in the luma channel of the image to be processed by means of a filter.

In an example of the foregoing embodiments, the high-frequency obtaining unit 53 is configured to subtracting pixel values of the smooth image at corresponding positions in the luma channel from all pixel values in the luma channel of the image to be processed to obtain the high-frequency image.

In an example of the foregoing embodiments, the skin tone high-frequency unit 54 is configured to performing element multiplication on the high-frequency image and the facial skin tone mask based on preset first superimposition strength to obtain the facial skin tone high-frequency image.

In an example of the foregoing embodiments, the apparatus further includes: a signal obtaining unit, configured to obtain the luma channel signal of the image to be processed based on the luma channel of the YCrCb optimized color video signal space; and obtain the luma channel signal of the facial skin tone high-frequency image based on the luma channel of the YCrCb optimized color video signal space.

In an example of the foregoing embodiments, the apparatus further includes: a space conversion unit, configured to convert the image to be processed to the optimized color video signal space.

Figure 6:
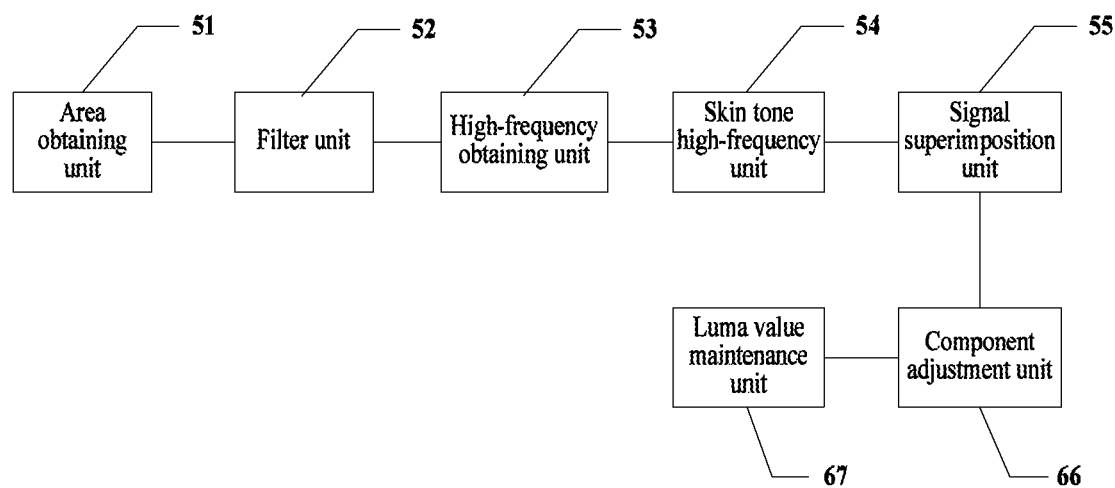
FIG. 6 illustrates a schematic structural diagram of another embodiment of an image processing apparatus according to the present disclosure.

FIG. 6 is a schematic structural diagram of another embodiment of an image processing apparatus according to the present disclosure. As shown in FIG. 6, the apparatus of this embodiment includes: an area obtaining unit 51, configured to obtain a facial skin tone area in an image to be processed, where there are many ways to obtain the facial skin tone area, as long as which parts of the image involve skin tone can be identified. The facial skin tone area may be obtained based on chroma and saturation in a YCrCb optimized color video signal space, or may be obtained by a neural network or other technologies;

a filter unit 52, configured to filter the image to be processed to obtain a smooth image, where image filtering is to suppress the noise of a target image while retaining the detail features of the image as much as possible, and is an indispensable operation in image preprocessing, and its processing effect would directly affect the effectiveness and reliability of subsequent image processing and analysis; in the embodiments, a high-frequency image is obtained based on the smooth image and the image to be processed; and the high-frequency image can reflect more details of the skin, so as to optimize the details of the facial skin;

a high-frequency obtaining unit 53, configured to obtain a high-frequency image based on the smooth image and the image to be processed;

a skin tone high-frequency unit 54, configured to obtain a facial skin tone high-frequency image based on the high-frequency image and a facial skin tone mask;

a signal superimposition unit 55, configured to superimpose a luma channel signal of the facial skin tone high-frequency image onto a luma channel signal of the image to be processed to obtain a first image;

a component adjustment unit 66, configured to convert the first image to an RGB space, and adjust color components in the first image based on the RGB space, where the RGB color mode is a color standard in industry, and is to obtain various colors by changing three color channels of Red (R), Green (G), and Blue (B) and superimposing them on each other; RGB represents the colors of the three channels of red, green and blue; and by adjusting the colors in the first image in the RGB space, the color of the facial skin tone is adjusted; and a luma value maintenance unit 67, configured to convert the first image that the color components have been adjusted to an HSL space, and maintain the luma value of the first image that the color components have been adjusted to be unchanged based on the HSL space, to obtain a second image.

The HSL color mode is a color standard in industry, and is to obtain various colors by changing three color channels of Hue (H), Saturation (S) and Lightness (L) and superimposing them on each other. HSL represents the colors of the three channels of hue, saturation, and lightness. The luma value of the first image may be maintained to be unchanged in the HSL space.

According to the image processing method provided by one or more embodiments, by adjusting the colors and tones in the first image in the RGB space, the problem in the prior art that the overall skin tone is yellowish or reddish after beautifying processing is overcome, making the skin tone meet requirements, and making the facial skin shiny in combination with luma adjustment.

In an example of the foregoing embodiments, the component adjustment unit 66 is configured to increase cyan component and magenta component and reduce yellow component in the first image based on the RGB space.

According to still another embodiment of the image processing apparatus provided by the present disclosure, based on the foregoing embodiments, the apparatus of this embodiment further includes: a shadow obtaining unit, configured to obtain a shadow area on a face area in the first image or the second image based on the values of luma and chroma in the optimized color video signal space; and a shadow processing unit, configured to increase the luma value and the red component value in the shadow area to obtain a third image or a fourth image.

In one or more embodiments, a shadow area in the face area may be determined by means of luma and chroma, and by adjusting the luma value and the red component value in the shadow area, the stereoscopic effect of the skin may be improved and a shiny and rosy effect may be achieved.

In an example of the foregoing embodiments, the shadow processing unit includes: a shadow dot product obtaining module, configured to obtain a first luma superimposition map based on a dot product of all pixel values of the shadow area in the luma channel and a superimposition value of the first image or the second image in the luma channel; or obtain a second luma superimposition map based on a dot product of all pixel values of the shadow area in the luma channel and a superimposition value of the second image in the luma channel; and a shadow luma superimposition module, configured to obtain a first luma dot product by performing a dot product operation on the first luma superimposition map and preset second superimposition strength; correspondingly superimpose the first luma dot product onto pixel values of the first image in the luma channel; or obtain a second luma dot product by performing a dot product operation on the second luma superimposition map and the preset second superimposition strength; and correspondingly superimpose the second luma dot product onto pixel values of the second image in the luma channel.

In an example of the foregoing embodiments, the shadow processing unit further includes:

a shadow chroma superimposition module, configured to obtain a first chroma superimposition map based on a dot product of all pixel values of the shadow area in the chroma channel and a superimposition value of the first image in the chroma channel; or obtain a second chroma superimposition map based on a dot product of all pixel values of the shadow area mask in the chroma channel and a superimposition value of the second image in the chroma channel; and a shadow chroma dot product module, configured to obtain a first chroma dot product by performing a dot product operation on the first chroma superimposition map and the preset second superimposition strength; correspondingly superimpose the first chroma dot product onto pixel values of the first image in the chroma channel; or obtain a second chroma dot product by performing a dot product operation on the second chroma superimposition map and the preset second superimposition strength; and correspondingly superimpose the second chroma dot product onto pixel values of the second image in the chroma channel.

In an example of the foregoing embodiments, the shadow obtaining unit is further configured to convert the second image to the optimized color video signal space, before processing the second image.

In yet another embodiment of the image processing apparatus provided by the present disclosure, based on the foregoing embodiments, the apparatus of this embodiment further includes: a lip obtaining unit, configured to obtain a lip area on a face area in the first image, the second image, the third image, or the fourth image according to the values of luma and chroma in the optimized color video signal space; and a lip processing unit, configured to increase the luma value and the red component value in the lip area to obtain a fifth image, a sixth image, a seventh image, or an eighth image.

In one or more embodiments, based on the second image, a shadow area mask in the face area may be determined by means of luma and chroma, and by adjusting the luma value and the red component value in the shadow area mask, the stereoscopic effect of the skin may be improved and a shiny and rosy effect may be achieved.

In an example of the foregoing embodiments, the lip processing unit includes:

a lip luma dot product module, configured to obtain a third luma superimposition map, a fourth luma superimposition map, a fifth luma superimposition map, or a sixth luma superimposition map based on a dot product of all pixel values of the lip area in the luma channel and a superimposition value of the first image, the second image, the third image, or the fourth image in the luma channel; and a lip luma superimposition module, configured to correspondingly superimpose a dot product of the third luma superimposition map and preset third superimposition strength onto pixel values of the first image in the luma channel; or, correspondingly superimpose a dot product of the fourth luma superimposition map and the preset third superimposition strength onto pixel values of the second image in the luma channel; or, correspondingly superimpose a dot product of the fifth luma superimposition map and the preset third superimposition strength onto pixel values of the third image in the luma channel; or, correspondingly superimpose a dot product of the sixth luma superimposition map and the preset third superimposition strength onto pixel values of the fourth image in the luma channel.

In an example of the foregoing embodiments, the lip processing unit further includes:

a lip chroma dot product module, configured to obtain a third chroma superimposition map, a fourth chroma superimposition map, a fifth chroma superimposition map, or a sixth chroma superimposition map by performing a dot product operation on all pixel values of the lip area in the chroma channel and a superimposition value of the first image, the second image, the third image, or the fourth image in the chroma channel; and a lip chroma superimposition module, configured to correspondingly superimpose a dot product of the third chroma superimposition map and the preset third superimposition strength onto pixel values of the first image in the luma channel; or, correspondingly superimpose a dot product of the fourth chroma superimposition map and the preset third superimposition strength onto pixel values of the second image in the luma channel; or, correspondingly superimpose a dot product of the fifth chroma superimposition map and the preset third superimposition strength onto pixel values of the third image in the luma channel; or correspondingly superimpose a dot product of the sixth chroma superimposition map and the preset third superimposition strength onto pixel values of the fourth image in the luma channel.

In an example of the foregoing embodiments, the lip obtaining unit is further configured to convert the second image to the optimized color video signal space, before processing the second image.

An electronic device provided according to one aspect of the embodiments of the present disclosure includes a processor, where the processor includes the foregoing image processing apparatus.

An electronic device provided according to one aspect of one or more embodiments of the present disclosure includes:

a memory, configured to store executable instructions; and a processor, configured to communicate with the memory to execute the executable instructions so as to complete operations of the foregoing image processing method.

A computer storage medium provided according to one aspect of some embodiments of the present disclosure is configured to store computer readable instructions, where when the instructions are executed, operations of the foregoing image processing method are executed.

Figure 7:
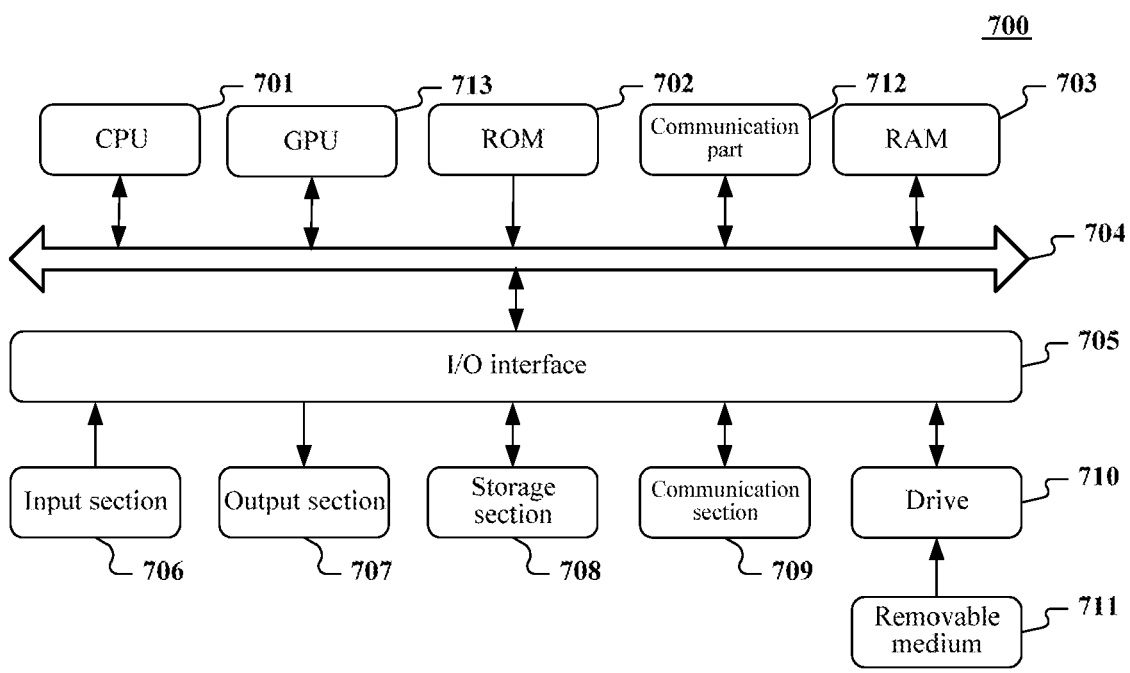
FIG. 7 illustrates a schematic structural diagram of an electronic device for implementing a terminal device or a server in embodiments of the present disclosure.

The embodiments of the present disclosure further provide an electronic device, which, for example, may be a mobile terminal, a Personal Computer (PC), a tablet computer, a server, and the like. Referring to FIG. 7 below, a schematic structural diagram of an electronic device 700, which may be a terminal device or a server, suitable for implementing the embodiments of the present disclosure is shown. As shown in FIG. 7, the computer system 700 includes one or more processors, a communication part, and the like. The one or more processors are, for example, one or more Central Processing Units (CPUs) 701 and/or one or more Graphic Processing Units (GPUs) 713, and the processor may execute appropriate actions and processing according to executable instructions stored in a Read Only Memory (ROM) 702 or executable instructions loaded from a storage section 708 to a Random Access Memory (RAM) 703. The communication part 712 may include, but not limited to, a network card. The network card may include, but not limited to, an Infiniband (IB) network card. The processor may communicate with the ROM 702 and/or the RAM 730, to execute executable instructions. The processor is connected to the communication part 712 via a bus 704, and communicates with other target devices via the communication part 712, thereby implementing corresponding operations of any method provided in the embodiments of the present disclosure, for example, obtaining a facial skin tone area in an image to be processed; filtering the image to be processed to obtain a filtered smooth image; obtaining a high-frequency image based on the smooth image and the image to be processed; obtaining a facial skin tone high-frequency image based on the high-frequency image and a facial skin tone mask; and superimposing a luma channel signal of the facial skin tone high-frequency image onto a luma channel signal of the image to be processed to obtain a first image.

In addition, the RAM 703 further stores various programs and data required for operations of an apparatus. The CPU 701, the ROM 702, and the RAM 703 are connected to each other via the bus 704. In the presence of the RAM 703, the ROM 702 is an optional module. The RAM 703 stores executable instructions, or writes the executable instructions to the ROM 702 during running. The executable instructions cause the processor 701 to execute corresponding operations of the foregoing communication method. An Input/Output (I/O) interface 705 is also connected to the bus 704. The communication part 712 may be integrated, or may be configured to have multiple sub-modules (for example, multiple IB network cards) connected to the bus.

The following components are connected to the I/O interface 705: an input section 706 including a keyboard, a mouse and the like; an output section 707 including a Cathode-Ray Tube (CRT), a Liquid Crystal Display (LCD), a speaker and the like; a storage section 708 including a hard disk and the like; and a communication section 709 of a network interface card including an LAN card, a modem and the like. The communication section 709 performs communication processing via a network such as the Internet. A drive 710 is also connected to the I/O interface 705 according to requirements. A removable medium 711 such as a magnetic disk, an optical disk, a magneto-optical disk, a semiconductor memory or the like is installed on the drive 710 according to requirements, so that a computer program read from the removable medium is installed on the storage section 708 according to requirements.

It should be noted that the architecture illustrated in FIG. 7 is merely an optional implementation mode. During specific practice, the number and types of the components in FIG. 7 may be selected, decreased, increased, or replaced according to actual requirements. Different functional components may be separated or integrated or the like. For example, the GPU and the CPU may be separated, or the GPU may be integrated on the CPU, and the communication portion may be separated from or integrated on the CPU or the GPU or the like. These alternative implementations all fall within the scope of protection of the present disclosure.

Particularly, a process described above with reference to a flowchart according to the embodiments of the present disclosure is implemented as a computer software program. For example, the embodiments of the present disclosure include a computer program product, including a computer program tangibly included on a machine readable medium; the computer program includes program codes for executing the method shown in the flowchart; the program codes may include corresponding instructions for executing operations of the method provided in the embodiments of the present disclosure, for example, obtaining a facial skin tone area in an image to be processed; filtering the image to be processed to obtain a filtered smooth image; obtaining a high-frequency image based on the smooth image and the image to be processed; obtaining a facial skin tone high-frequency image based on the high-frequency image and a facial skin tone mask; and superimposing a luma channel signal of the facial skin tone high-frequency image onto a luma channel signal of the image to be processed to obtain a first image. In such embodiments, the computer program is downloaded and installed from the network through the communication section 709, and/or is installed from the removable medium 711. The computer program, when being executed by the CPU 701, executes the foregoing functions defined in the methods of the present disclosure.

The methods, apparatuses, and devices in the present disclosure are implemented in many manners. For example, the methods, apparatuses, and devices in the present disclosure are implemented with software, hardware, firmware, or any combination of software, hardware, and firmware. The foregoing sequence of the operations of the method is merely for description, and unless otherwise stated particularly, the operations of the method in the present disclosure are not limited to the described sequence. In addition, in some embodiments, the present disclosure is also implemented as programs recorded in a recording medium. The programs include machine-readable instructions for implementing the methods according to the present disclosure. Therefore, the present disclosure further covers the recording medium storing the programs for performing the methods according to the present disclosure.

The descriptions of the present disclosure are provided for the purpose of examples and description, and are not intended to be exhaustive or limit the present disclosure to the disclosed form. Many modifications and changes are obvious to a person of ordinary skill in the art. The embodiments are selected and described to better describe a principle and an actual application of the present disclosure, and to make a person of ordinary skill in the art understand the present disclosure, so as to design various embodiments with various modifications applicable to particular use.

The invention claimed is:

1. An image processing method, performed by an electronic device comprising a processor, comprising:
  obtaining a facial skin tone area in an original image;
  filtering the original image to obtain a smooth image;
  obtaining a high-frequency image based on the smooth image and the original image;
  obtaining a facial skin tone high-frequency image based on the high-frequency image and a facial skin tone mask, wherein the facial skin tone mask is a mask for the facial skin tone area and indicates the facial skin tone area; and
  superimposing a luma channel signal of the facial skin tone high-frequency image onto a luma channel signal of the original image to obtain a first image;
  wherein the obtaining a facial skin tone area in an original image comprises:
  obtaining the facial skin tone area in the original image based on a YCrCb optimized color video signal space, wherein the YCrCb optimized color video signal space comprises a luma channel, a chroma channel, and a saturation channel; and
  the filtering the original image comprises: filtering the original image in the luma channel, wherein the method further comprises:
  converting the first image to an RGB space;
  adjusting color components in the first image based on the RGB space;
  converting the first image that the color components have been adjusted to a Hue, Saturation, and Lightness (HSL) space, and
  maintaining a luma value of the first image that the color components have been adjusted to be unchanged based on the HSL space, to obtain a second image.

2. The method according to claim 1, wherein the obtaining the facial skin tone area in the original image based on a YCrCb optimized color video signal space comprises:
  determining a skin tone area in the original image based on a chroma value and a saturation value of the original image in the YCrCb optimized color video signal space;
  obtaining a key point of a face in the original image by using a neural network; and
  determining the facial skin tone area in the original image according to the key point of the face.

3. The method according to claim 1, wherein the filtering the original image in the luma channel comprises: performing box filtering on all pixel values in the luma channel of the original image based on a filter.

4. The method according to claim 1, wherein the obtaining a high-frequency image based on the smooth image and the original image comprises: subtracting, from all pixel values of the original image in the luma channel, pixel values at corresponding positions of the smooth image in the luma channel to obtain the high-frequency image.

5. The method according to claim 1, wherein the obtaining a facial skin tone high-frequency image based on the high-frequency image and a facial skin tone mask comprises: performing element multiplication on the high-frequency image and the facial skin tone mask based on preset first superimposition strength to obtain the facial skin tone high-frequency image.

6. The method according to claim 1, wherein before the superimposing a luma channel signal of the facial skin tone high-frequency image onto a luma channel signal of the original image, the method comprises:
  obtaining the luma channel signal of the original image based on the luma channel of the YCrCb optimized color video signal space; and obtaining the luma channel signal of the facial skin tone high-frequency image based on the luma channel of the YCrCb optimized color video signal space.

7. The method according to claim 1, wherein before the obtaining a facial skin tone area in the original image based on the YCrCb optimized color video signal space, the method further comprises: converting the original image to the YCrCb optimized color video signal space.

8. The method according to claim 1, wherein the adjusting color components in the first image based on the RGB space comprises: increasing cyan component and magenta component and reducing yellow component in the first image based on the RGB space.

9. The method according to claim 1, further comprising:
obtaining a shadow area on a face area in the first image based on values of luma and chroma in the YCrCb optimized color video signal space; and
increasing a luma value and a red component value in the shadow area to obtain a third image.

10. The method according to claim 9, wherein the increasing the luma value in the shadow area comprises:
obtaining a first luma superimposition map based on a dot product of all pixel values of the shadow area in the luma channel and a superimposition value of the first processed image in the luma channel;
obtaining a first luma dot product by performing a dot product operation on the first luma superimposition map and preset second superimposition strength; and
correspondingly superimposing the first luma dot product onto pixel values of the first image in the luma channel.

11. The method according to claim 9, wherein the increasing the red component value in the shadow area comprises:
obtaining a first chroma superimposition map based on a dot product of all pixel values of the shadow area in the chroma channel and a superimposition value of the first image in the chroma channel;
obtaining a first chroma dot product by performing a dot product operation on the first chroma superimposition map and the preset second superimposition strength; and
correspondingly superimposing the first chroma dot product onto pixel values of the first image in the chroma channel.

12. The method according to claim 9, further comprising:
converting the second image to the YCrCb optimized color video signal space;
obtaining a shadow area mask on a face area in the second image based on the values of luma and chroma in the YCrCb optimized color video signal space; and
increasing a luma value and a red component value in the shadow area mask to obtain a fourth image;
wherein the increasing a luma value in the shadow area comprises:
obtaining a second luma superimposition map based on a dot product of all pixel values of the shadow area in the luma channel and a superimposition value of the second image in the luma channel;
obtaining a second luma dot product by performing a dot product operation on the second luma superimposition map and preset second superimposition strength; and
correspondingly superimposing the second luma dot product onto pixel values of the second image in the luma channel;
wherein the increasing a red component value in the shadow area comprises:
obtaining a second chroma superimposition map based on a dot product of all pixel values of the shadow area mask in the chroma channel and a superimposition value of the second image in the chroma channel;
obtaining a second chroma dot product by performing a dot product operation on the second chroma superimposition map and the preset second superimposition strength; and
correspondingly superimposing the second chroma dot product onto pixel values of the second image in the chroma channel.

13. The method according to claim 12, further comprising:
obtaining a lip area on a face area in the first image, the third image, or the fourth image according to the values of luma and chroma in the YCrCb optimized color video signal space; and
increasing a luma value and a red component value in the lip area to obtain a fifth image, a seventh image, or an eighth image.

14. The method according to claim 13, wherein the increasing the luma value in the lip area comprises:
respectively obtaining a third luma superimposition map, a fifth luma superimposition map, or a sixth luma superimposition map based on a dot product of all pixel values of the lip area in the luma channel and a superimposition value of the first image, the third image, or the fourth image in the luma channel;
correspondingly superimposing a dot product of the third luma superimposition map and preset third superimposition strength onto pixel values of the first image in the luma channel;
correspondingly superimposing a dot product of the fifth luma superimposition map and the preset third superimposition strength onto pixel values of the third image in the luma channel; and
correspondingly superimposing a dot product of the sixth luma superimposition map and the preset third superimposition strength onto pixel values of the fourth image in the luma channel.

15. The method according to claim 13, wherein the increasing the red component value in the lip area comprises:
respectively obtaining a third chroma superimposition map, a fifth chroma superimposition map, or a sixth chroma superimposition map by performing a dot product operation on all pixel values of the lip area in the chroma channel and a superimposition value of the first image, the third image, or the fourth image in the chroma channel;
correspondingly superimposing a dot product of the third chroma superimposition map and the preset third superimposition strength onto pixel values of the first image in the luma channel;
correspondingly superimposing a dot product of the fifth chroma superimposition map and the preset third superimposition strength onto pixel values of the third image in the luma channel; and
correspondingly superimposing a dot product of the sixth chroma superimposition map and the preset third superimposition strength onto pixel values of the fourth image in the luma channel.

16. The method according to claim 12, further comprising:
converting the second image to the YCrCb optimized color video signal space;
obtaining a lip area on a face area in the second image based on the values of luma and chroma in the YCrCb optimized color video signal space; and increasing the luma value and the red component value in the lip area to obtain a sixth image;

wherein the increasing the luma value in the lip area comprises:

obtaining a fourth luma superimposition map based on a dot product of all pixel values of the lip area in the luma channel and a superimposition value of the second image in the luma channel; and correspondingly superimposing a dot product of the fourth luma superimposition map and preset third superimposition strength onto pixel values of the second image in the luma channel;

wherein the increasing the red component value in the lip area comprises:

obtaining a fourth chroma superimposition map by performing a dot product operation on all pixel values of the lip area in the chroma channel and a superimposition value of the second image in the chroma channel; and correspondingly superimposing a dot product of the fourth chroma superimposition map and the preset third superimposition strength onto pixel values of the second image in the luma channel.

17. An electronic device, comprising:

a processor; and memory for storing instructions executable by the processor;

wherein execution of the instructions by the processor causes the processor to perform:

obtaining a facial skin tone area in an original 1 image;

filtering the original image to obtain a smooth image;

obtaining a high-frequency image based on the smooth image and the original image;

obtaining a facial skin tone high-frequency image based on the high-frequency image and a facial skin tone mask, wherein the facial skin tone mask is a mask for the facial skin tone area and indicates the facial skin tone area; and superimposing a luma channel signal of the facial skin tone high-frequency image onto a luma channel signal of the original image to obtain a first image;

wherein the obtaining a facial skin tone area in an original image comprises:

obtaining the facial skin tone area in the original image based on a YCrCb optimized color video signal space, wherein the YCrCb optimized color video signal space comprises a luma channel, a chroma channel, and a saturation channel; and the filtering the original image comprises: filtering the original image in the luma channel, wherein the method further comprises:

converting the first image to an RGB space;

adjusting color components in the first image based on the RGB space;

converting the first image that the color components have been adjusted to a Hue, Saturation, and Lightness (HSL) space, and maintaining a luma value of the first image that the color components have been adjusted to be unchanged based on the HSL space, to obtain a second image.

18. A non-transitory computer storage medium, configured to store computer-readable instructions, wherein execution of the instructions by the processor causes the processor to perform:

obtaining a facial skin tone area in an original image;

filtering the original to obtain a smooth image;

obtaining a high-frequency image based on the smooth image and the original image;

obtaining a facial skin tone high-frequency image based on the high-frequency image and a facial skin tone mask, wherein the facial skin tone mask is a mask for the facial skin tone area and indicates the facial skin tone area; and superimposing a luma channel signal of the facial skin tone high-frequency image onto a luma channel signal of the image to be processed original image to obtain a first image;

wherein the obtaining a facial skin tone area in an original image comprises:

obtaining the facial skin tone area in the original image based on a YCrCb optimized color video signal space, wherein the YCrCb optimized color video signal space comprises a luma channel, a chroma channel, and a saturation channel; and the filtering the original image comprises: filtering the original image in the luma channel, wherein the method further comprises:

converting the first image to an RGB space;

adjusting color components in the first image based on the RGB space;

converting the first image that the color components have been adjusted to a Hue, Saturation, and Lightness (HSL) space, and maintaining a luma value of the first image that the color components have been adjusted to be unchanged based on the HSL space, to obtain a second image.

* * * * *